United States Patent [19]

Fischer

[11] 4,010,807
[45] Mar. 8, 1977

[54] TOOL FOR FORMING A HOLE FOR A FASTENING ELEMENT

[76] Inventor: Athur Fischer, Altheimer Strasse 219, D-7241 Tumlingen, Germany

[22] Filed: Oct. 2, 1974

[21] Appl. No.: 511,256

[30] Foreign Application Priority Data

Oct. 5, 1973 Germany .................... 2349998

[52] U.S. Cl. .................... 175/325; 29/522; 175/408; 408/83; 408/202

[51] Int. Cl.² .................... E21B 17/10; E21C 9/00

[58] Field of Search ........... 29/522; 408/72 B, 115, 408/202, 227, 228, 241, 83, 80, 81, 82; 175/173, 289, 325, 408, 343, 263; 90/15 R

[56] References Cited

UNITED STATES PATENTS

| | | | |
|---|---|---|---|
| 1,170,221 | 2/1916 | Craven | 175/289 |
| 1,283,740 | 11/1918 | Groff | 408/227 X |
| 1,336,800 | 4/1920 | Vincent | 90/15 R X |
| 2,583,429 | 1/1952 | Johnson | 408/83 X |
| 2,794,468 | 6/1957 | Huxtable | 408/227 X |
| 2,833,168 | 5/1958 | Nelson | 408/202 |
| 2,903,920 | 9/1959 | Blecha | 408/115 |
| 2,932,196 | 4/1960 | Sledz | 408/82 X |
| 3,372,610 | 3/1968 | Johansson | 408/227 |
| 3,403,594 | 10/1968 | Newell | 29/522 X |
| 3,477,481 | 11/1969 | Czerniewicz | 408/213 X |

*Primary Examiner*—Charlie T. Moon
*Attorney, Agent, or Firm*—Michael J. Striker

[57] ABSTRACT

A substantially cylindrical hole is drilled into a support structure, and the end of the hole remote from the point of entry of the drilling tool into the structure is enlarged in its cross-sectional area so as to provide abutment surfaces for spreading portions of a fastening element inserted into the hole subsequently to the drilling thereof. The drilling tool includes a drill shaft, and a drill bit connected to the free end of the drill shaft and having lateral cutting edges. The cutting edges may diverge in direction axially away from the drill shaft and a collar may be provided on the drill shaft which, in cooperation with the inner surface bounding the hole forms a fulcrum for a lever-type angular displacement of the drilling tool for increasing the cross-sectional area of the remote end of the hole. The collar may be mounted on the drill shaft for displacement between a plurality of axially spaced positions and for arresting in any one of these positions so as to adjust the drilling tool to a particular depth of the hole to be drilled.

6 Claims, 3 Drawing Figures

TOOL FOR FORMING A HOLE FOR A FASTENING ELEMENT

BACKGROUND OF THE INVENTION

The present invention relates generally to the formation of a hole in a support structure, and more particularly to a method of and a tool for forming a hole for insertion and anchoring of a fastening element therein.

There are already known various fastening elements which have spreading portions for the purpose of anchoring the fastening element in the support structure. The fastening elements here under discussion are conventional and, generally speaking, such fastening element includes an expansion sleeve of generally cylindrical configuration prior to the insertion and anchoring of the fastening element in the hole of a support structure, and a screw accommodated in the sleeve, such sleeve having spreading portions which, when the screw is tightened, spread apart and anchor the sleeve and thus the screw in the support structure. The spreading of the spreading portions may be achieved either by the screw itself which may be threaded into a converging hole in the sleeve, or by an expander element mounted on the screw and being drawn between the spreading portions pushing them apart during the tightening of the screws. Such arrangements achieve satisfactory results provided that the material of the support structure is such as to permit at least partial yielding of the walls surrounding the end of the hole in the region of which the spreading portions of the sleeve are accommodated. In this event, the spreading portions of the sleeve deform the walls in such a region, thus in effect forming a V-shaped or a conical enlarged portion in the hole so that the spreading portions of the sleeve engage behind the material of the support structure. It will be understood that the anchoring action of the fastening element, that is the load which the fastening element is capable of supporting, is proportional to the degree to which the spreading portions of the sleeve are spread apart for any given material of the support structure. Besides the force available for tightening the screw, the most important factor determinative of the degree of spreading of the spreading portions is the material used for the spreading portions, particularly its rigidity. However, experience has shown that when the conventional fastening elements are to be accommodated and anchored in holes provided in relatively rigid support structures, such as masonry walls or concrete structures, the anchoring effect is rather unsatisfactory due to the fact that even when high grade alloyed steels are used for the fastening element, the spreading of the spreading portions of the sleeve is minute since the material of the support structure will yield only slightly with disproportionately increasing force being needed for tightening the screw of the fastening element and spreading apart the spreading portions thereof. Furthermore, even if an unlimited tightening force were available, with such high rigidity of the walls surrounding the end of the hole it would be the spreading portions of the sleeve which would become deformed rather than the walls surrounding the hole.

SUMMARY OF THE INVENTION

Accordingly, it is an object of the present invention to avoid the disadvantages of the prior art methods of anchoring fastening elements in relatively rigid support structures.

It is a further object of the present invention to provide a method of forming holes in relatively rigid structures suitable for accommodation and anchoring of conventional fastening elements therein, which is devoid of the disadvantages attendant to the prior art methods.

It is still another object of the present invention to increase the anchoring action of a conventional fastening element in a hole provided in a relatively rigid support structure with attendant reduction of the force needed for spreading the spreading portions of the sleeve of the fastening element.

It is a concomitant object of the present invention to provide a tool for forming a hole in a relatively rigid structure for accommodating and anchoring a fastening element therein.

In pursuance of these objects and others which will become apparent hereafter, one of the features of the invention resides, briefly stated, in a method of anchoring a fastening element having spreading portions in a support structure having an exposed surface, including the steps of providing a substantially cylindrical hole in the support structure, the hole extending from the exposed surface into the interior of the support structure and having an inner end remote from the exposed surface; and increasing the cross-sectional area of the hole in the region of the inner end thereof preparatory to insertion of the fastening element into the hole so as to provide undercut abutment surfaces for engagement by the spreading portions of the fastening element.

The tool for drilling holes in support structures for anchoring therein fastening elements having spreading portions of a predetermined length according to the invention comprises, in combination, a drill shaft having an axis and a smaller radius than the hole to be drilled and adapted to be driven into rotation about the axis; and a drill bit at one end of the drill shaft and having cutting edges projecting substantially radially of the axis and beyond the drill shaft to a distance from the axis corresponding to the radius of the hole to be drilled, the length of at least one of the cutting edges at least corresponding to said predetermined length, the drill bit being adapted for increasing the cross-sectional area of the hole in a region remote from the point of entry of the drill bit into the support structure so as to provide in the above-mentioned region undercut abutment surfaces for engagement by the spreading portions of the fastening element.

The hole which is produced according to the method of the invention and utilizing the tool of the invention has an increased cross-sectional area at the end of the hole which is remote from the exposed surface of the support structure so that, when the fastening element is inserted into the hole and the screw thereof is tightened, the spreading portions of the sleeve of the fastening element are free to expand without meeting any substantial resistance until they abut against the undercut abutment surface of the enlarged portion and are pressed against the same. It may be seen that even if the pressure exerted by the spreading members on the abutment surfaces is relatively low, the degree of the anchoring action is substantial so that the resistance of the fastening element to extraction from the hole is very high, whereby substantial loads may be connected to the fastening element and thereby to the support structure. Furthermore, due to the fact that the enlarged portion of the hole diverges in direction away from the exposed surface of the support structure in general conformity with the divergence of the spreading portions of the expansion sleeve of the fastening element, a much better pressure distribution over the surfaces of the spreading portions which engage the abutment surfaces of the hole is achieved than heretofore possible.

It may also be seen that because of the prefabrication of the enlarged portion of the hole in the support structure, the concentration of stresses and forces into the leading edges of the expanion sleeve is prevented, which is advantageous not only because such concentration usually results in the deformation of such edges, but also because of the fact that, when the fastening element is to be anchored in a relatively hard and porous support structure, it could result in the destruction of the material between the pores and, in the most aggravated instance, in dissociation of a cone of the material from the remainder of the support structure, whereby the anchoring action would be totally destroyed.

As already mentioned above, the drilling tool may include a drill shaft and a drill bit connected to the free end of the drill shaft. In the currently preferred embodiment of the invention, the drill bit is configurated as a drill leaf extending radially of the axis of the drill shaft and provided with cutting edges in the radially outward regions thereof. At least the drill bit may be made of hard metal, such as alloyed steel, in order to reduce the abrasion thereof to a minimum. Since the drill bit extends radially outwardly beyond the drill shaft, it is possible to incline the drill axis with respect to a central axis of the bore once the latter has been drilled to a sufficient or desired depth, either in a rocking motion or in a circular motion, while the drilling tool is being driven into rotation about its axis. In this manner, the bottom portion of the hole is enlarged by forming an undercut portion therein, which is generally V-shaped in case of the rocking angular displacement of the drill axis, or conical in the event that circular motion of the drill axis has been performed. In any event, the abutment surfaces which bound the enlarged portion diverge in direction away from the exposed surface of the support structure. The kind of movement or inclination performed during the drilling of the enlarged portion will depend on the configuration of the fastening element to be secured in the hole, particularly on the number and arrangement of the spreading portions of the expansion sleeve.

Experience has shown that a particularly advantageous configuration of the enlarged portion is obtained when the drill bit itself or at least the cutting edges thereof diverge in direction away from the drill shaft since then the abutment surfaces of the enlarged portion may advantageously steplessly merge into the internal surface defining the remainder of the hole.

While the rocking or circular motion of the drilling tool with respect to the center axis of the hole may be performed by a skilled user of the drilling tool without any auxiliary equipment, experience has shown that best results in terms of the shape of the undercut portion of the hole are obtained when a collar, which may preferably have a spherical outer contour, is mounted on the drill shaft and forms with the hole a fulcrum for the angular displacement of the drilling tool about the same in a lever-type fashion. The collar may have a diameter larger than the diameter of the hole and in this event the collar rests against the accessible edge of the hole which may be chamfered. However, it is currently preferred that the collar have a diameter no greater than the diameter of the hole, in which event the collar is accommodated in the interior of the hole in the region of the accessible end thereof and abuts against the interior surface of the support structure which defines the hole. Because of the substantially spherical outer contour of the collar, the drilling tool may easily be tilted about the region in which the collar contacts the surface bounding the hole, whereby the undercut portion is produced.

Preferably, the collar is mounted on the drill shaft for displacement axially thereof and is arrestable in any selected position thereon so that the position of the collar with respect to the shaft may be adjusted for different depths of the hole being drilled. In this manner, full use is made of the lever effect obtained by using the collar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figures 1, 2:
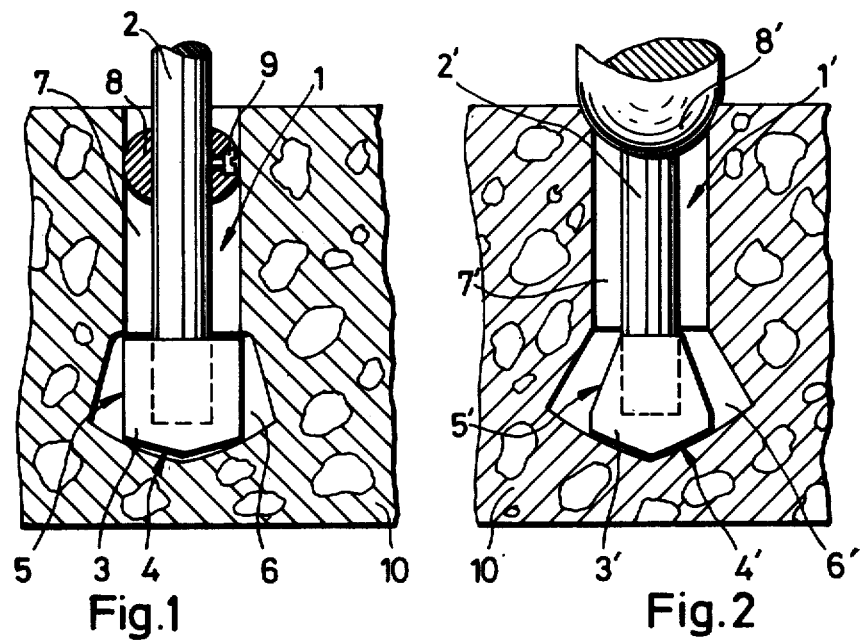
FIG. 1 is a cross-sectional view of a support structure with a drilling tool according to a first embodiment of the invention being accommodated therein.
FIG. 2 is a similar view showing a drilling tool according to another embodiment of the invention.

Referring now to the drawings, and first to FIG. 1 thereof, it may be seen that a drilling tool 1 includes a drill shaft 2 and a drill bit 3 in form of a drill leaf. At least the drill bit 3 may be made of hard metal, such as alloyed steel. The drill bit is provided with front cutting edges 4 and with lateral cutting edges 5 which in this embodiment extend parallel to the axis of the drill shaft 2. The drill shaft 2 has a radius smaller than a hole 7 to be drilled in a support structure 10, and the drill bit 3 extends radially outwardly beyond the drill shaft 2 to a distance from the axis of the drill shaft 2 corresponding to the radius of the hole 7 to be drilled.

Having so described the drilling tool 1, the operation thereof will now be briefly discussed. The drilling tool 1 is set into rotary motion about its longitudinal axis and applied to the region of the exposed surface of the support structure 10, not necessarily in that order, whereby the cutting edges 4 contact and penetrate such exposed surface. By applying axial force to the drilling tool 1, the drilling tool 1 penetrates into the interior of the support structure 10 and to a predetermined depth. In this manner, a cylindrical hole 7 of predetermined depth is obtained. Now, in accordance with the invention, the bottom part of the hole 7 is to be provided with an enlarged portion 6. This is achieved by angularly displacing the axis of the drilling tool 1 with respect to the center axis of the hole 7 which has just been provided as described above, whereby the cutting edges 5 remove additional amounts of material from the support structure 10 in the bottom region of the hole 7 until the cross-sectional area of such bottom region is sufficiently enlarged to form the enlarged portion 6, the purpose of which will be described later on. The angular displacement of the axis of the drilling tool 1 may be performed in one plane only, in which case a V-shaped enlarged portion 6 is obtained, or in a circular motion in which case enlarged portion 6 is of generally conical configuration.

While the angular displacement of the axis of the drilling tool 1 with respect to the center axis of the hole 7 may be accomplished by a skilled user without the use of any auxiliary equipment, it is currently preferred that a collar 8 which may have a substantially spherical outer contour be provided on and connected to the drill shaft 2. Preferably, the collar 8 is mounted on the drill shaft 2 for displacement axially thereof, and a set screw 9 is provided serving the purpose of arresting the collar 8 in any desired position with respect to the drill shaft 2. The largest diameter of the collar 8 generally corresponds to the diameter of the hole 7, and the collar 8 is so positioned on the drill shaft 2 that, when the drilling tool 1 penetrates to the desired depth into the support structure 10, the collar 8 is located within the confines of the hole 7 preferably in the region thereof which is adjacent to the exposed surface of the support structure 10. The collar 8 cooperates with the wall bounding the hole 7 so as to form a fulcrum for a lever-type angular displacement of the drilling tool 1 with respect to the central axis of the bore 7.

FIG. 2 shows a different embodiment of the invention, and similar parts have been assigned the same reference numerals supplemented with a prime. In this embodiment, the lateral cutting edges 5' of the drill bit 3' diverge in direction away from the drill shaft 2' of the drilling tool 1'. Once the hole 7' has been produced in the support structure 10, as a result of the drilling action of the cutting edges 4', the drilling tool 1' is again rocked or circulated similarly to what has been described above whereby an enlarged portion 6' is obtained which has a different configuration from that described above. In this embodiment, the enlarged portion 6' steplessly merges into the hole 7' provided in the support structure 10.

This embodiment also illustrates a different collar 8' which is connected to the drill shaft 2', which has a diameter exceeding that of the hole 7'. In this event, the collar 8' abuts against the edges surrounding the hole 7', which may be chamfered, thus preventing any further penetration of the drilling tool 1' into the structure 10, and simultaneously serving as a fulcrum for the lever-type rocking or circular motion of the drilling tool 1' during the production of the enlarged portion 6'. It will be understood that the collar 8' may be used in combination with the drill bit 3 and vice versa and also that the collar 8, 8' may be omitted altogether.

Figure 3:
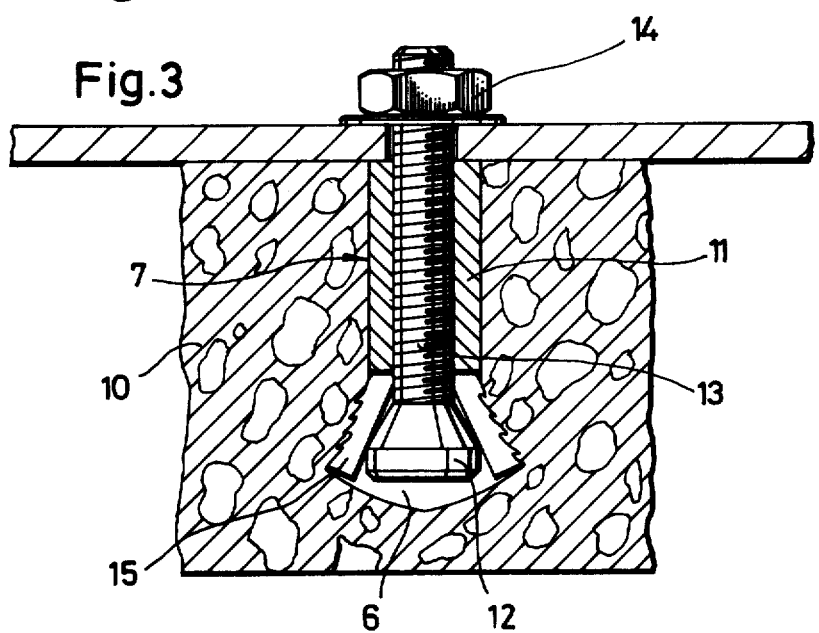
FIG. 3 is a similar view showing a fastening element anchored in a hole produced according to the invention.

Having so described the tool for producing the hole 7, 7' having the enlarged portion 6, 6', reference is now being had to FIG. 3 which shows how a fastening element is accommodated and anchored in such a hole 7. The fastening element is of a conventional design and includes an expansion sleeve 11 which has spreading portions 15. A screw 13 is located in the interior of the expansion sleeve 11, and has an expander portion 12 cooperating with the spreading portions 15 of the expansion sleeve 11. Originally, the spreading portions 15 are parallel to the axis of the screw 13 so that the fastening element may be inserted into the hole 7. A nut 14 is threaded on the screw 13 and, after the fastening element has been inserted into the hole 7, the nut 14 is tightened which results in an axial displacement of the screw 13 together with the expander portion 12 with respect to the expansion sleeve 11 and the spreading portions 15 thereof with attendant spreading apart of the latter. Since the hole 7 has been formed with the enlarged portion 6, the spreading portions 15 of the expansion sleeve 11 encounter no resistance while being spread apart except for the inherent resistance of the material of the spreading portions 15 to deformation. Once the spreading portions 15 of the expansion sleeve 11 contact the abutment surfaces bounding the enlarged portion 6, the fastening element is securely anchored in the hole 7 even if no further expansion force is applied by the expander portion 12 of the screw 13 on the spreading portions 15 of the expansion sleeve 11, pressing the latter against the abutment surfaces bounding the enlarged portion 6 of the hole 7. Thus, no yielding of the material of the support structure 10 is necessary for safely anchoring the fastening element in the hole 7, but the degree of anchoring of the fastening element in the hole 7 is sufficiently high for withstanding even extremely high extraction forces acting on the screw 13. It may be seen that the configuration of the hole 7 and of the enlarged portion 6' thereof which is obtained by using the tool illustrated in FIG. 2 is very advantageous because in this case the abutment surfaces bounding the enlarged portion 6' steplessly merge into the hole 7 in conformity with the stepless deformation of the spreading portions 15 of the expansion sleeve 11 during their spreading apart. Thus, in this embodiment, the surface pressure on the abutment surfaces bounding the enlarged portion 6' is uniformly distributed over the contact areas of the spreading portions 15 of the expansion sleeve 11.

It will be understood that each of the elements described above, or two or more together, may also find a useful application in other types of support structures differing from the types described above. So, for instance, if the fastening element is to be anchored in support structures of different, less rigid materials, holes of similar configurations may also be prefabricated.

While the invention has been illustrated and described as embodied in a method of and a tool for providing a hole in a relatively rigid support structure for accommodating and anchoring a fastening element therein, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. A tool for drilling undercut holes in a stationary support structure comprising, in combination, an elongated drill shaft having an axis of rotation; a drill bit at one end of said drill shaft and having cutting edges located radially outwardly of said drill shaft, said cutting edges being operative for removing material from the stationary support structure to initially form a cylindrical hole therein; and means axially adjustably fixed to said drill shaft for supporting said drill shaft and pivoting the latter out of axial coincidence with the cylindrical hole about a fulcrum located adjacent an inlet end of the hole whereby said cutting edges remove material from the support structure beyond the confines of the cylindrical hole in a region thereof remote from the inlet end to thereby increase the cross-sectional area of the hole in such region at a selected distance from said fulcrum.

2. A tool as defined in claim 1, wherein said cutting edges diverge in direction axially away from said drill shaft.

3. A tool as defined in claim 1, wherein said drill bit is a drill leaf extending substantially radially of said axis and provided with said cutting edges.

4. A tool as defined in claim 1 said supporting means comprising a collar connected to said drill shaft.

5. A tool as defined in claim 4, wherein the contour of said collar is part-circular at least in the region of contact of said collar with the support structure.

6. A tool for drilling undercut holes in stationary support structure for anchoring therein fastening elements having spreading portions of a predetermined length, comprising in combination, an elongated drill shaft having an axis of rotation; a drill bit at one end of said drill shaft and having cutting edges located radially outwardly of said drill shaft, at least one of said cutting edges having a length at least corresponding to said predetermined length, said cutting edges being operative for removing material from the stationary support structure to initially form a cylindrical hole therein; and means axially adjustably fixed to said drill shaft for supporting said drill shaft and pivoting the latter out of axial coincidence with the cylindrical hole about a fulcrum located adjacent an inlet end of the hole whereby said cutting edges remove material from support structure beyond the confines of the cylindrical hole in a region thereof remote from the inlet end to thereby increase the cross-sectional area of the hole in such region and provide undercut abutment surfaces for engagement by the spreading portions of the fastening element in such region at a selected distance from said fulcrum.

* * * * *